May 29, 1956
E. N. PHILLIPS
2,748,345
STANDING WAVE DEVICE
Filed Feb. 2, 1953
4 Sheets-Sheet 1
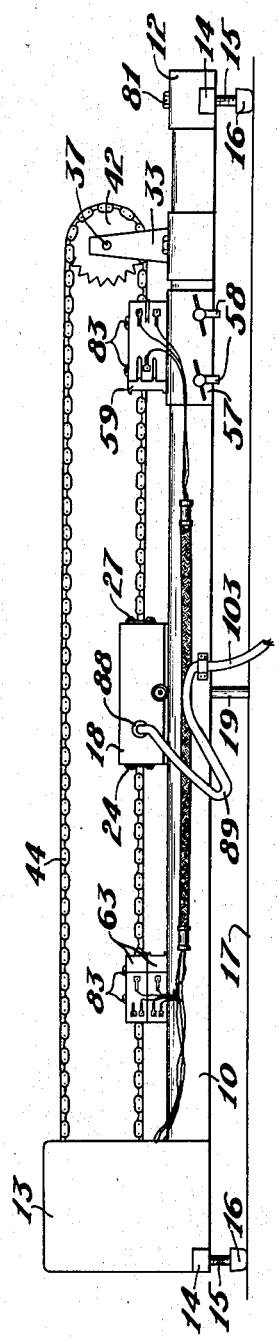
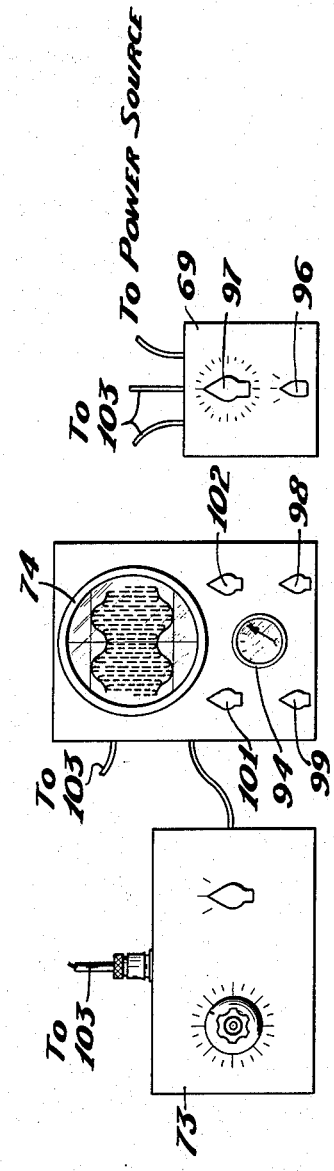
INVENTOR.
EDWIN N. PHILLIPS
BY
ATTORNEY

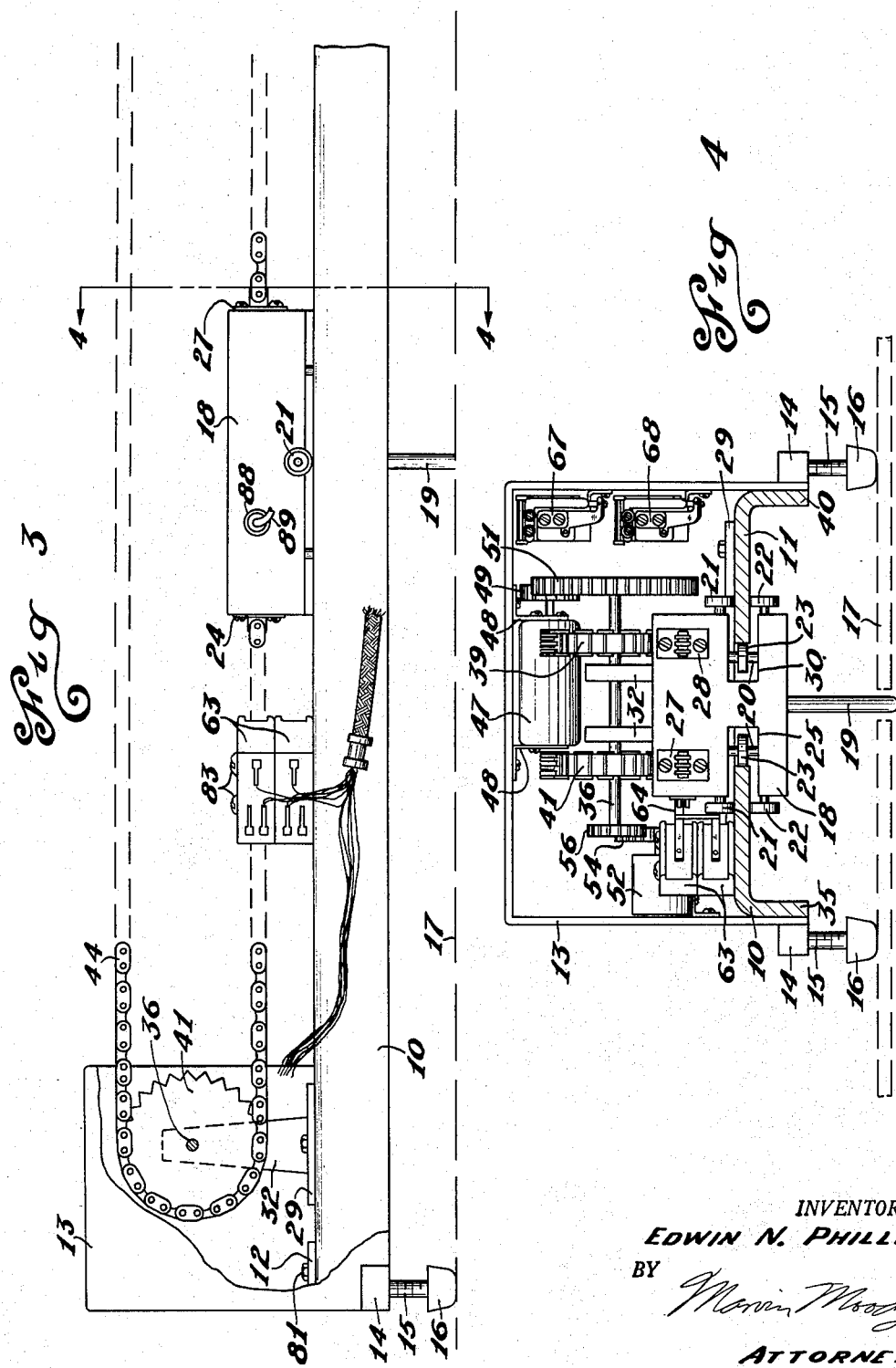

May 29, 1956  E. N. PHILLIPS  2,748,345
STANDING WAVE DEVICE
Filed Feb. 2, 1953  4 Sheets-Sheet 3
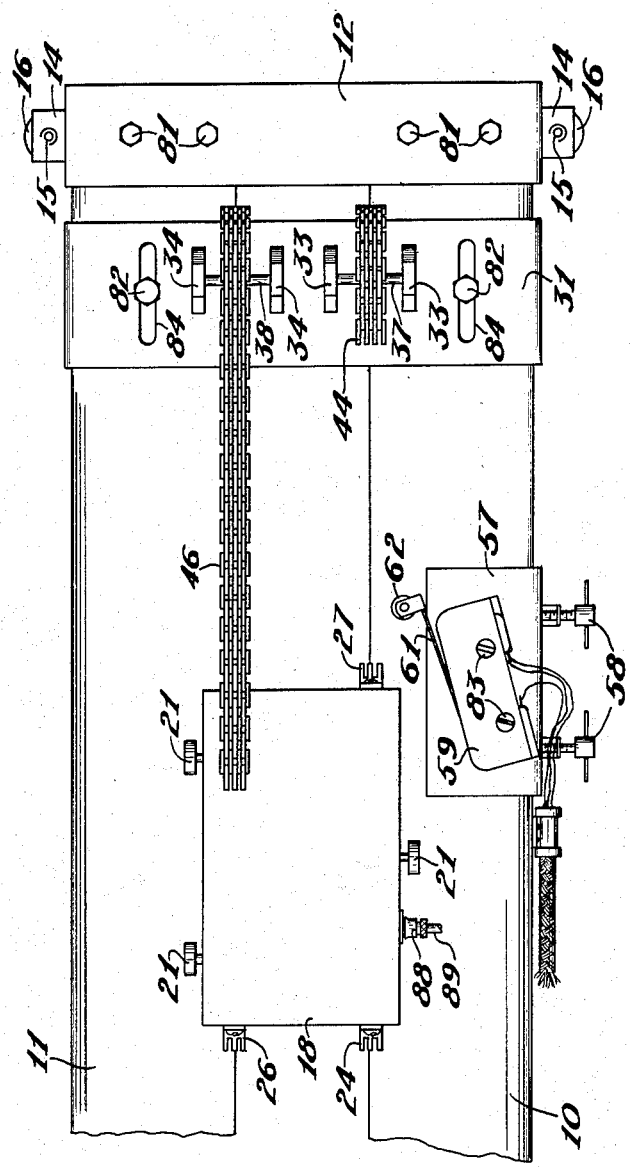
INVENTOR.
EDWIN N. PHILLIPS
BY
ATTORNEY May 29, 1956
E. N. PHILLIPS
2,748,345
STANDING WAVE DEVICE
Filed Feb. 2, 1953
4 Sheets-Sheet 4
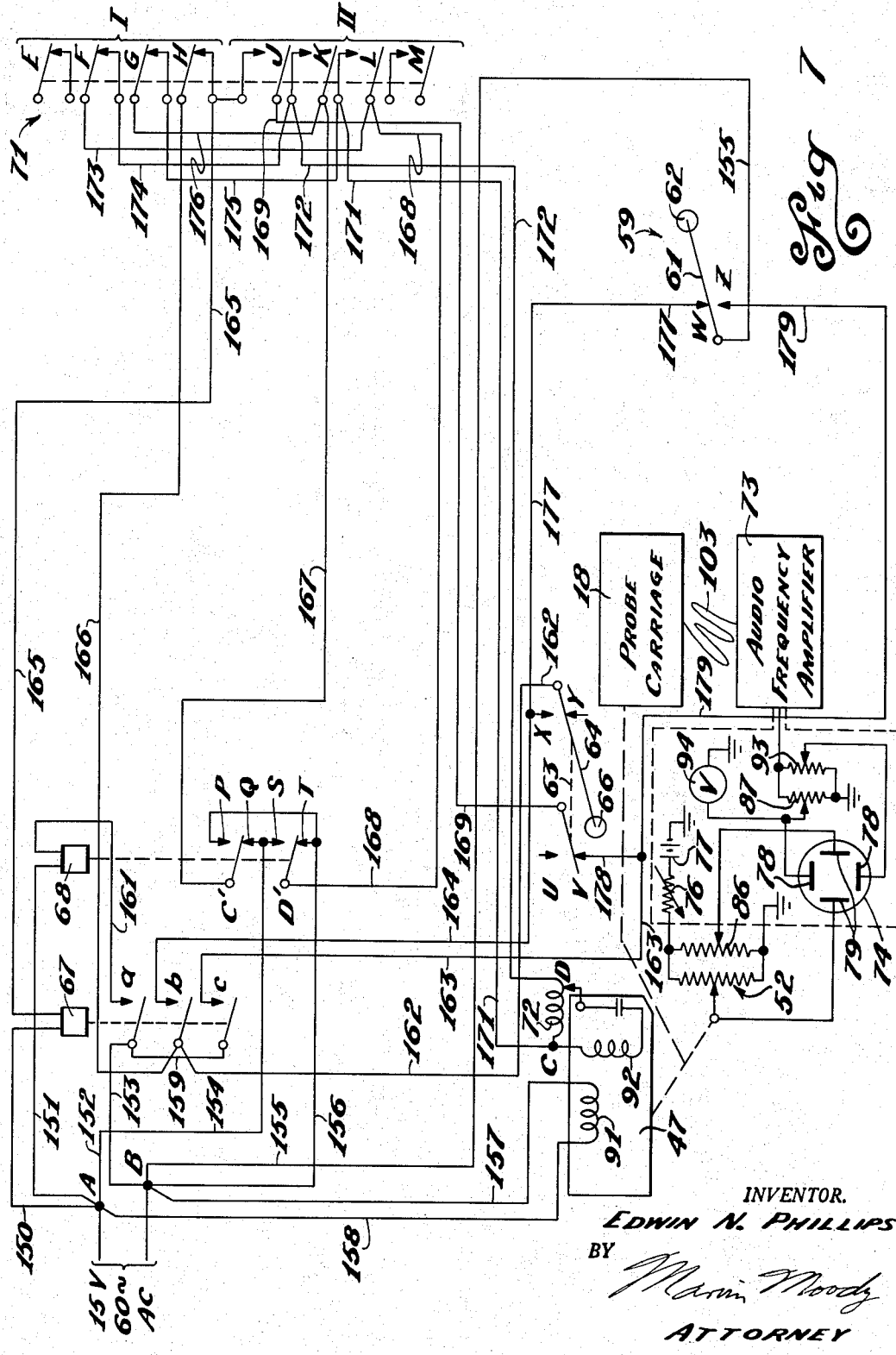
INVENTOR.
EDWIN N. PHILLIPS
BY
ATTORNEY United States Patent Office 2,748,345
Patented May 29, 1956

2,748,345

STANDING WAVE DEVICE

Edwin N. Phillips, Cedar Rapids, Iowa, assignor to Collins Radio Company, Cedar Rapids, Iowa, a corporation of Iowa Application February 2, 1953, Serial No. 334,626

8 Claims. (Cl. 324—58)

This invention relates to standing wave measuring devices and, more particularly, to a standing wave measuring device for indicating standing waves in very high and ultra high frequency transmission systems.

An object of this invention is to provide an automatic means for portraying standing waves in a portion of wave guide or coaxial cable.

Oftentimes it becomes necessary in very high and ultra high frequency transmission systems to measure the efficiency of power transfer from a source to a load. It is an object of this invention to provide a means for quickly measuring such efficiency.

Often it becomes necessary to adjust such a system to obtain maximum power transfer. It is another object of this invention to provide an instrument which will quickly indicate what adjustments may be necessary to obtain maximum power transfer through the line.

One way to measure the efficiency of power transfer through a transmission line is to measure the standing wave ratio of the line. Often, a slotted line is used with a manual probe. Due to the time necessary in this procedure, the source, line, or load parameters would often change to cause inaccuracies. A resultant plot of the wave is subject to these errors. An instrument which would almost instantaneously show a picture of a standing wave in the line would avoid the possibility of such inaccuracy. If the parameters should change, the whole wave picture would immediately change. It is therefore another object of this invention to immediately depict on an oscilloscope the standing wave pattern inside a line.

Another object is to provide a quick means for measuring the wave length of an ultra high frequency wave being transmitted through a wave guide or coaxial cable.

Yet another object is to provide a means for determining the degree of mismatch.

Still another object is to provide an automatically synchronized saw tooth sweep circuit for the oscilloscope.

Although a few methods for automatically indicating standing waves have previously been devised, they operate only when the wave guide or coaxial cable is maintained within narrow limits of size and shape. It is therefore an object of this invention to provide an instrument which may be used with wave guide or coaxial cable of any size or shape and which has a straight line portion.

It is another object of this invention to provide an instrument which can indicate standing waves in any straight portion of wave guide or coaxial cable without the insertion of a special line portion with its danger of wave distortion and reflection.

This invention can also operate with curved wave guides and coaxial cables.

Another object is to provide means for remotely matching impedance.

A feature of the invention is found in the provision for a probe carriage which is driven along a track in a reciprocating manner. The amount of carriage travel is automatically controlled by relays and limit switches. The carriage pulls a probe along a wave guide slot and an output is obtained which indicates the amplitude of a standing wave along the guide. The signal is impressed on the vertical plate of an oscilloscope. A carriage driven potentiometer provides an automatically synchronized saw tooth sweep that is placed on the horizontal plates of the oscilloscope.

Other objects, features and advantages will become apparent from the following specification and drawings, in which:

Figure 1 is an elevational view of the device;

Figure 2 is an elevational view of the control instruments for the device;

Figure 3 is a fragmentary elevational view of the motor end of the device;

Figure 4 is a sectional view of the motor end of the device as viewed across section 4—4 of Figure 3;

Figure 5 is a fragmentary top view of the end opposite that shown in Figure 3;

Figure 6 is a fragmentary elevational view of the portion shown in Figure 5; and Figure 7 is a schematic diagram of the device.

Referring to Figures 1, 3, 4 and 5, L-shaped rails 10 and 11 are mounted parallel to each other and form a track. At each end of the track tie plates 12 are rigidly connected to rails 10 and 11 by bolts 81 to maintain them in a rigid parallel relationship.

A housing 13 is fastened to the sides 35 and 40 of rails 10 and 11 at one end thereof. It extends upwardly above the rails as shown in Figures 3 and 4.

Leg supports 14 are fastened to the track to support it. An adjustable leg 15 is threadedly received in each leg support 14 and extends downwardly as shown in Figure 4. The bottom of each adjustable leg 15 has a rubber foot 16. The rubber feet 16 rest on a supporting surface 17 which might be the top surface of a wave guide.

A probe carriage 18 is suspended between rails 10 and 11 by guide wheels 21, 22 and 23 that are rotatably attached to carriage 18.

Three guide wheels 21 are mounted on transverse axes above the rails so that they engage the upper surface of the rails on either side of the carriage. These wheels carry the weight of the carriage. There are two wheels on rail 10 and one on rail 11, but it is to be realized that any suitable number of wheels may be used.

Three guide wheels 22 are mounted on transverse axes below the rails and engage the underside of rails 10 and 11. One engages rail 10 and two rail 11.

A pair of slots 25 and 30 are formed through the carriage 18 as shown in Figure 4. Vertical shafts 20 are mounted in slots 25 and 30 and rotatably support the guide wheels 23. These wheels engage the edges of rails 10 and 11 to prevent transverse movement of the carriage.

Chain brackets 24 and 26 are fastened to the side of carriage 18 which face housing 13 and chain brackets 27 and 28 are fastened to the opposite side of carriage 18.

An adjustable pedestal 31 rests on rails 10 and 11. (See Figures 5 and 6.) Adjustable pedestal 31 has a bolt 82 on each side which extends through a small longitudinal slot 84 in each rail which permits longitudinal adjustment of pedestal 31 with respect to rails 10 and 11.

A pair of idler supports 33 are mounted on adjustable pedestal 31 and rotatably support idler shaft 37 which in turn carries idler sprocket 42. Another pair of idler supports 34 are also mounted uprightly on adjustable pedestal 31 at one side of supports 33 and rotatably support idler shaft 38 which carries idler sprocket 43.

A fixed pedestal 29 is fastened to the rails 10 and 11 at the end opposite the pedestal 31 as shown in Figure 3.

A pair of upright drive supports 32 are mounted on pedestal 29 so as to be parallel to one another.

A drive shaft 36 rotatably extends through the upper portion of both drive shaft supports 32 (see Figure 4), and is transverse to the longitudinal direction of the rails. A pair of drive sprockets 39 and 41 are mounted on shaft 36.

A chain 46 (which may be of the silent chain type) is received around drive sprocket 39 and idler sprocket 43. The chain 46 has its ends attached to the carriage 18 with one end fastened to chain bracket 26 and the other end to chain bracket 28.

Another chain 44 is received about drive sprocket 41 and idler sprocket 42. One end of chain 44 is fastened to chain bracket 24, and the other end is fastened to chain bracket 27. Slack in the chains may be taken up by adjusting the position of pedestal 31.

A drive motor 47 is fastened to the inside of the upper part of housing 13 by means of motor brackets 48. A motor pinion 49 is fixed at the end of the motor shaft and meshes with a drive gear 51 fixed on the adjacent end of drive shaft 36.

Thus, means are provided for moving carriage 18 relative to the rails between the housing 13 and pedestal 31 as shown in Figure 1.

As shown in Figure 4, a potentiometer 52 is attached to housing 13 by means of potentiometer bracket 53. The potentiometer shaft supports a potentiometer gear 54 which meshes with a potentiometer drive pinion 56 carried on drive shaft 36. Thus, the resistance of the potentiometer varies with drive shaft position.

Slidably attached to rail 10 adjacent pedestal 31 is a travel adjustment shelf 57 which may be fastened in any longitudinal position which reference to the rail by clamps 58. (See Figures 5 and 6.) A backward limit switch 59 is fixed to the upper surface of shelf 57 by bolts 83. Switch 59 is actuated by a switch operating lever 61 that extends into the path of carriage 18. A roller 62 is supported at the end of switch lever 61.

A pair of forward limit switches 63 are mounted on rail 10 near housing 13. Switches 63 are fastened on their side, one above the other, by bolts 83 and are actuated by switch levers 64 which extend outward into the path of carriage 18. Levers 64 are fastened together and are also tipped with rollers (not shown). The switches 59 and 63 are actuated when engaged by carriage 18. Switches 59 and 63 are two position, single pole, double throw types.

A latching relay 67 and a pole changing relay 68 are fastened to the inside of housing 13. (See Figure 4.) As shown in Figure 7 latching relay 67 has three normally open contacts, "a," "b" and "c." The pole changing relay 68 has two normally open contacts, "p" and "s," and two normally closed contacts, "q" and "t." (The terms "normally open" and "normally closed" refer to the condition of mating relay contacts when the relay is not energized.)

A control lever switch 71 is operated by a knob 96 and is mounted in a switching station 69 as shown in Figure 2. Control lever switch 71 has three positions, forward, off and reverse. There are eight contacts in switch 71 as shown in Figure 7. These contacts are "e," "f," "g," "h," and "j," "k," "l," "m." They are interlocked. When switch 71 is in the "forward" position, contacts "e," "f," "g" and "h" are closed, and contacts "j," "k," "l" and "m" are open. When switch 71 is in the "reverse" position, contacts "j," "k," "l" and "m" are closed and contacts "e," "f," "g" and "h" are open. In off position, all contacts are open.

A variac 72 is connected in the field circuit of motor 47 as shown in Figure 7. Variac 72 is mounted in switching station 69 in Figure 2 and may be manually controlled with knob 97.

An oscilloscope 74 contains horizontal plates 79 and vertical plates 78. (See Figure 7.) The upper vertical plate 78 is connected to an amplifier 73 through a movable tap on a grounded high resistance rheostat designated as amplitude control 87 which is controlled by knob 98 shown in Figure 2.

The lower vertical plate 78 is also connected to amplifier 73 through a movable tap on another grounded high resistance rheostat designated as vertical positioning rheostat 93 which is operated by a knob 99.

The left horizontal plate 79 is connected to the adjustable tap of potentiometer 52 which, it will be remembered, is driven by drive shaft 36.

The right horizontal plate 79 in Figure 7 is connected to an adjustable tap on a sweep centering rheostat 86 which is manually operated by a knob 101 shown in Figure 2. Rheostat 86 is connected in parallel with potentiometer 52. They are grounded on one side and are connected on their other side to a direct current power source 77 through a sweep width control rheostat 76 which is manually controlled by knob 102 in Figure 2.

Amplifier 73 is connected by a suitable transmission line 103 to a flexible cable 89 which is fastened to carriage 18 by a plug 88. There is a detector circuit inside of probe carriage 18 of the type familiar to those skilled in the art. Its input end is connected to probe 19, and its output end is connected to plug 88. The flexibility of cable 89 allows reciprocating movement of carriage 18.

In the electromechanical operation of the device, control lever switch 71 will first be considered in off position where all eight contacts are open. A suitable power source is connected to points A and B in Figure 7.

It will be noted that field coil 91 is connected directly across points A and B. Therefore, coil 91 will always stay energized at the same polarity.

To begin the operation of the device, control lever switch 71 is moved to the forward position where contacts "e," "f," "g" and "h" are closed and contacts "j," "k," "l" and "m" remain open as shown in Figure 7. The other field coil 92 will be energized. Let it be assumed that rotation of motor 47 will begin in a clockwise direction to drive carriage 18 to the left in Figure 1. A circuit through field coil 92 is completed from point A through wires 152, 167, 176, 175, 171, through coil 92, wires 172, 174, 173, 168 and 156 to point B.

As carriage 18 travels to the left in Figure 1, it will contact roller 66 and depress lever 64 which will actuate forward limit switch 63. When switch 63 is actuated, contacts "x" close and contacts "v" and "y" open.

The closing of contact "x" causes latching relay 67 to be energized, which, in turn, causes pole changing relay 68 to be energized. A circuit is completed from point A through wires 150, 165, 166, 162, contacts "x," wires 177 and 155 to point B. The energized latching relay 67 closes contacts "a," "b" and "c." When contact "a" is closed, pole changing relay 68 is energized by a circuit from point A through wires 151, 161, contacts "a," and wire 153 to point B.

Energizing relay 68 reverses the direction of motor 47 so that it turns counterclockwise.

This may be explained as follows: To prove that relay 68 controls motor direction, it will be observed in Figure 7 that points C' and D' on relay 68 are on opposite sides of coil 92. A reversal of the polarity of points C and D will reverse the rotation of motor 47. Points C and C' are connected by wires 171, 175, 176 and 167 and therefore must have the identical polarity. Points D and D' are connected by wires 172, 174, 173 and 168, and therefore must also have identical polarity. Therefore the polarity across C—D must follow the polarity across C'—D'. While relay 68 is unenergized, its contacts "q" and "t" are closed and the polarity of points A and B will correspond to the polarity of points C' and D', respectively, which must also be the polarity of points C and D. However, when pole changing relay 68 is energized, contacts "q" and "t" open and contacts "p" and "s" close to reverse the polarity of points C' and D' with respect to points A and B. This reverses the polarity of points C and D with respect to points A and B. The polarity of field coil 92 is then reversed while the polarity of coil 91 remains unchanged. Therefore, the reversal of the contacts in relay 68 will change the direction of rotation of motor 47.

Since the motor direction is now reversed, carriage 18 must travel in the opposite direction which is to the right relative to Figures 1 and 3. Carriage 18 will back off of roller 66 and the contacts of switch 63 will return to their normal position with contacts "x" open and contacts "v" and "y" closed. However relays 67 and 88 will remain energized and motor 47 will continue to rotate in a counterclockwise direction because of a parallel circuit through relay 67 from point A through wires 150, 165, 166, 164, 177, contacts "w," and wire 155 to point B.

Finally as carriage 18 travels to the right, it will strike roller 62 and depress lever 61 which will open contact "w" and break the circuit through latching relay 67. The armature of relay 67 will drop and open contacts "a." Pole changing relay 68 will be de-energized since contacts "a" are in series with it. When pole changing relay 68 is de-energized, contacts "p" and "s" will open and contacts "q" and "t" will close. The polarity across field coil 92 will reverse, as explained above, and the direction of carriage 18 will reverse to travel in the forward direction to the left in Figure 1.

As carriage 18 moves forward to release roller 62, the contacts "w" and "z" of switch 59 return to their normal position as shown in Figure 7. Relays 67 and 68 will remain unenergized and carriage 18 will continue to the left in Figure 1.

Carriage 18 will ultimately strike roller 66. Another cycle of reciprocating movement will then follow, which will be exactly identical with the preceding described cycle, while switch 71 is in forward position.

When switch 71 is put in reverse position a somewhat different sequence of events will occur. If control lever switch 71 is put in reverse position, the carriage 18 will begin traveling to the right in Figure 1 instead of to the left as it did when switch 71 was in forward position. In reverse position, contacts "e," "f," "g" and "h" are open, while contacts "j," "k," "l" and "m" are closed to complete a circuit from point A through wires 152, 167, 172, coil 92, wires 171, 168 and to point B. The polarity of points C' and D' now correspond to the polarity of points D and C, respectively, and the polarity of coil 92 has been reversed.

Carriage 18 will then move to the right until it strikes roller 62 to close contacts "z" and energize latching relay 67 by a circuit from point A through wires 150, 165, 169, 178, 179, contacts "z," and wire 155 to point B. When the contacts of relay 67 close, a circuit is completed through relay 68 to reverse the direction of motor 47 and carriage 18 as previously explained.

As the carriage 18 starts to move to the left in Figure 1, roller 62 is released, and contacts "z" open. The forward movement of the carriage 18 is not changed because contacts "c" are closed to complete a parallel circuit through relay 67 from point A through wires 150, 165, 169, 178, 163, contacts "c," wires 159 and 153 to point B.

As probe carriage 18 continues to travel to the left, it will strike roller 66 to actuate forward limit switch 63 to open contacts "v" and break the circuit through relay 68. The direction of carriage 18 will reverse and travel to the right in Figures 1 and 3. A new cycle of operation is begun. Such a sequence of operations will be repetitive, while switch 71 is in "reverse" position.

It will be noted that the direction of movement of carriage 18 can be reversed at any time by throwing reversing lever switch 71 to "off," and then to either "forward" or "reverse" position as required.

To operate the device, it may be placed on a horizontal wave guide with the end of the probe 19 inserted in a suitable longitudinal slot 81 formed in the guide. The legs, rails and limit switches are adjusted so that the probe 19 will move parallel to and will not strike the end of the slot 81 when the carriage 18 reciprocates. (It is understood that the probe may also be inserted in a slot in coaxial cable as well as in a wave guide.)

It is to be understood that this invention can be easily modified by one skilled in the art to operate in a great number of ways other than as illustrated. It can be used with very narrow as well as wide wave guide and coaxial cable by adapting special fastening means. Likewise, the device may be operated vertically as well as horizontally on any wave guide or coaxial cable by special fastening means. Also this invention can be built to operate on curved wave guide of any form by forming the rails 10 and 11 in a similar manner and by making suitable adjustments in the other components of the device.

To begin electronic operation of this invention, any ultra high frequency (UHF) carrier wave is transmitted into the source end of the line which might be for example, a 300 megacycle carrier wave. The carrier is then modulated at an audio rate which might be for example, a one kilocycle sine wave. Let it be assumed that the load end of the line is terminated in a mismatch and therefore standing current and voltage waves exist along the line.

Probe 19 may be either the capacitance or loop type to pick up either voltage or current standing waves, respectively. It is only necessary to adjust the polarity of the carrier according to the type of probe.

The loops of standing waves will oscillate at carrier frequency, which in the example chosen will be $3 \times 10^8$ times per second. The modulation of the carrier will control the amplitude of the carrier antinodes which, in the example, will vary at the audio rate. Likewise, the other parts of the standing wave loop will vary in sinusoidal fashion with the antinode or peak amplitudes along a standing wave loop will oscillate at an audio rate, which in the example would be 1000 times per second.

If the probe is held stationary at one point on the wave guide, it will pick up both the carrier frequency and side band audio frequencies of the standing wave at that point. However, there is a detector circuit in the probe carriage 18 which will detect only the audio frequency. Therefore only the audio variation of the standing wave peak amplitudes at that point are transmitted from the transmission line to oscilloscope 74. The antinodes of the audio will be proportional to the maximum amplitude of the standing wave at that point.

The detected audio is transmitted from cable 89 to amplifier 73 where it is amplified and sent to the vertical plates 78 of the oscilloscope 74. The vertical movement of the oscilloscope electron beam will be in proportion to the amplitude of the detected audio frequency which varies with peak carrier amplitudes. Therefore if the probe is held stationary at one point along the slot in the guide, it will cause the oscilloscope electron beam to fluctuate vertically in an amount proportional to the peak amplitudes of the carrier standing wave at that point.

Since it is desired to obtain a picture of the standing wave on the oscilloscope screen, it is necessary to move the beam horizontally as well as vertically so that the beam will be at the same horizontal position on the scope for a corresponding point along the wave guide slot. The potentiometer 52 is used to obtain a horizontal sweep circuit for this purpose. It was previously described how the tap of potentiometer 52 was geared to the movement of the carriage 18. The direct current output of potentiometer 52 will vary linearly with the movement of carriage 18. There will then be automatic synchronization, since at any one point along the line of travel of carriage 18 there can be only one specific voltage from potentiometer 52. This will cause a picture on the oscilloscope screen similar to that shown in Figure 2. The antinodes of the audio wave produce the upper and lower envelopes on the screen. Each envelope will be a representation of the standing wave. The center line between the waves is necessary to indicate the proportions of the wave.

Oscilloscope 74 contains a cathode ray tube of the long persistence type. This allows the electron beam to leave a green streak in its wake as it travels over the screen. Due to the swift movement of the beam, its green wake will appear as a green area between the wave envelopes.

It will, of course, be necessary to adjust the picture on the screen. There are four major controls indicated in Figures 2 and 7. These are the sweep width control rheostat 76, the sweep centering rheostat 86, the scope amplitude control 87, and the vertical positioning rheostat 93.

Scope amplitude control 87 proportionally controls two elements of the picture on the screen: The amplitude of the wave, and the vertical distance between the wave envelopes.

The sweep width control rheostat 76 is used to control the distance between nodes of the standing wave on the oscilloscope screen. It will be noted that by use of rheostat 76 in conjunction with the direct current voltage source 77, a standing wave of very small wave length would be capable of great magnification on the oscilloscope screen.

The sweep centering rheostat 86 is merely used to shift the picture to the right or to the left without changing its proportions. Vertical positioning rheostat 93 is used to shift the picture vertically without changing its proportions in any manner.

In order to obtain the standing wave ratio it is necessary to have some sort of calibration on the screen. One type of calibration which could be used with this device and is obvious to one skilled in the art, is partly shown in Figure 2. The picture is adjusted on the screen so that the peak point on the upper envelope coincides with the upper line marked 1.00. The lowest point on the lower envelope is adjusted to coincide with the lower line marked 1.00. Then the scaled value of the lowest point on the upper edge of the envelope will be the standing wave ratio. The scaled value of the highest point on the lower edge of the envelope will likewise indicate the standing wave ratio.

It is basic that a standing wave ratio of one is necessary for a maximum transfer of energy through a transmission line. This ratio will be attained when the envelope of the picture on the screen has a substantially straight upper side and a straight lower side. If an adjustment of the load is made, it will readily be observed from the screen whether that adjustment has improved the match or made it worse. By this technique, an adjustment on the line for maximum power transfer can be quickly and easily made.

A voltmeter 94 may be attached to the output of the audio amplifier 73 as shown in Figures 2 and 7. The amount of voltmeter needle swing will also indicate the size of the standing wave loops.

This invention is capable of remote operation. Since only an audio frequency voltage is transmitted from the carriage through line 103, it can be easily transmitted through ordinary wire cable for a great distance to the oscilloscope 74. Likewise the saw tooth wave from potentiometer 52 is of low frequency and is easily transferred over ordinary wire cable.

Because of attenuation in any transmission line, the most accurate place to observe standing waves is as near to the load as possible. An example of such a load is an antenna located at a relatively remote location. This invention can be used at such location in conjunction with a probing slot 81.

Since the length of carriage travel is known, the number of loops can be counted to determine the frequency of the transmitted wave.

While there has been described what is at present considered the preferred embodiment of the invention, it will be obvious to those skilled in the art that various changes and modifications may be made therein without departing from the spirit of the invention.

I claim:
1. An electromechanical device for detecting standing waves in a waveguide comprising, a carriage, a track which supports said carriage and allows it to move parallel to said waveguide, a wave energy probe attached to said carriage and extending into a slot formed in said waveguide, a driving means for said carriage, a first switch at one end of said track to reverse the direction of travel of said carriage, a second switch at the other end of said track to reverse the direction of travel of said carriage, and a detector circuit attached to said probe.

2. A sweep circuit for an oscilloscope used for portraying standing waves inside a waveguide comprising, a track mounted longitudinally over a slot in the waveguide, a carriage mounted on said track for longitudinal movement, a probe mounted on said carriage and extending into the waveguide, driving means for said carriage, a first reversing switch at one end of said track connected to said driving means, a second reversing switch at the other end of said track connected to said driving means, a potentiometer driven by said driving means so that its resistance will correspond to the longitudinal position of said carriage, a direct current source connected to said potentiometer so that the potentiometer voltage output will be proportional to the longitudinal position of said carriage, and said oscilloscope connected to said potentiometer and said probe.

3. A device for portraying standing waves comprising, a pair of rails mounted parallel to a longitudinal slot formed in a waveguide, a longitudinally moving carriage mounted on said rails, a wave sensitive probe fastened to said carriage and extending into said waveguide through the slot, an electric motor fastened near one end of said rails, mechanical power transmission means connecting said motor to said carriage, a first switch located at one end of said rails to reverse said motor upon approach of said carriage to the one end, a second switch located at the opposite end of said rails to reverse said motor upon the approach of said carriage to that rail end, a manually operated switch for manually controlling said drive motor, a variable resistor geared to said motor and furnishing an output resistance proportional to the longitudinal position of the carriage, a direct current source connected to said resistor so that the voltage across the resistor will be proportional to said carriage position, a detector circuit connected to said probe to furnish an output proportional to the standing waves in said waveguide, and an oscilloscope connected to said variable resistor and said detector to depict the standing waves in said waveguide.

4. An instrument for measuring standing waves in a radio frequency transmission line comprising, a pair of rails mounted parallel with said transmission line, a longitudinal movable carriage mounted on said rails, a wave sensitive probe fastened to said carriage and extending into a longitudinal slot in said transmission line, a first sprocket rotatably fixed at one end of the rails, a second sprocket rotatably fixed at the other end of said rails, a chain received about said sprockets and fastened to said carriage, an electric motor geared to one of said sprockets, a first switch fastened adjacent one end of said rails to reverse said motor upon contact by said carriage, a second switch mounted at the other end of said rails to reverse said motor upon contact by said carriage, a potentiometer mounted at one end of said rails, a variable element in said potentiometer geared to said drive motor, a direct current source connected to said potentiometer so that the variable element will furnish a sweep output proportional to the longitudinal position of said carriage, a detector circuit connected to said probe to furnish an output proportional to the wave energy in said transmission line at the probe position, and an oscilloscope connected to said probe and said variable element to indicate the standing waves in said transmission line.

5. An instrument for measuring standing waves in a radio frequency transmission line comprising, a track mounted parallel to said transmission line, a carriage mounted on said track, a wave sensitive probe fixed to said carriage and extending into a longitudinal slot in said line, a plurality of sprockets rotatably fixed at one end of said track, a second plurality of sprockets rotatably fixed at the other end of said track, a plurality of chains received about said sprockets and attached to said carriage, a reversible electric motor mounted at one end of said track and geared to the sprockets at that end, forward limit switches fixed at one end of said track for reversing said motor upon activation by said carriage, a backward limit switch adjustably mounted at the other end of said track for reversing said motor upon activation by said carriage, a latching relay, a pole changing relay which operates in conjunction with said latching relay and said switches to automatically reverse said carriage movement and cause said carriage to reciprocate between said switches, a manually operated switch for controlling said motor, a potentiometer mounted at the motor end of said track, a variable element in said potentiometer geared to said driving motor, a direct current source across said potentiometer to produce a saw tooth sweep circuit voltage across said variable element, a detector circuit connected to said probe to produce an output proportional to the wave energy in said line at the probe point, and an oscilloscope connected to said detector circuit and said potentiometer.

6. A system for reciprocating a probe carriage utilized in a standing wave indicating device comprising, a portion of waveguide formed with a longitudinal slot, a track mounted on said waveguide adjacent to said slot, the probe carriage slideably supported on said track, sprocket means supported by said waveguide, chain means connected to said carriage and engaged by said sprocket means, an electric motor supported by said waveguide and connected to drive said sprocket means, a plurality of limit switches mounted adjustably on said waveguide adjacent said slot, relay means electrically connected to said limit switches and motor to reverse said motor upon actuation of said limit switch by said carriage, and a control switch connected serially with said motor to start-stop and reverse it.

7. A system for reciprocating a probe carriage of a standing wave device comprising, a portion of waveguide formed with a longitudinal slot, a track mounted on said waveguide adjacent to said slot, the probe carriage slideably supported on said track, a driving sprocket rotatably supported by said waveguide at one end of said slot, an idler sprocket rotatably supported by said waveguide at the other end of said slot, a sprocket chain received tautly about said sprockets, an electric motor supported by said waveguide and connected to said driving sprocket, a forward limit switch supported by said waveguide adjacent one end of said slot, a backward limit switch supported by said waveguide adjacent the other end of said slot, a latching relay connected in series with said limit switches, a pole changing relay connected in series with some of the contacts of said latching relay, said motor connected to the contacts of said pole changing relay to reverse said motor upon actuation of either of said limit switches by said carriage, and a control switch connected to said motor and limit switches and relays to start-stop and reverse said motor.

8. A system for reciprocating the probe carriage in a standing wave device comprising, a waveguide formed with a longitudinal slot, a track mounted on said waveguide adjacent to said slot, the probe carriage slideably supported on said track, a driving sprocket supported rotatably by said waveguide at one end of said slot, an idler sprocket supported rotatably by said waveguide at the other end of said slot, a sprocket chain received tautly about said sprockets, an alternating current power source, an electrical motor of the split-phase type coupled to drive said driving sprocket and supported by said waveguide with one of its field coils connected across said power source, a pair of forward limiting switches supported by said waveguide adjacent one end of said slot, a backward limit switch supported by said waveguide adjacent the other end of said slot, a latching relay connected in series with a first of said forward switches, said backward switch connected to different contacts of said latching relay, said forward limit switches connected to different contacts of said latching relay, a pole changing relay connected across said power source in series with a contact of said latching relay, the second field coil of said motor connected to contacts of said pole changing relay, and a double-throw control switch with a plurality of poles connected serially with said relays and said motor to start-stop and reverse said motor.

References Cited in the file of this patent

Allen: "An Automatic Standing Wave Indicator," A. I. E. E. Transactions, vol. 67, 1948, pages 1299–1302